W. R. WILSON.
HUB STRUCTURE.
APPLICATION FILED JAN. 21, 1918.
1,304,231.
Patented May 20, 1919.
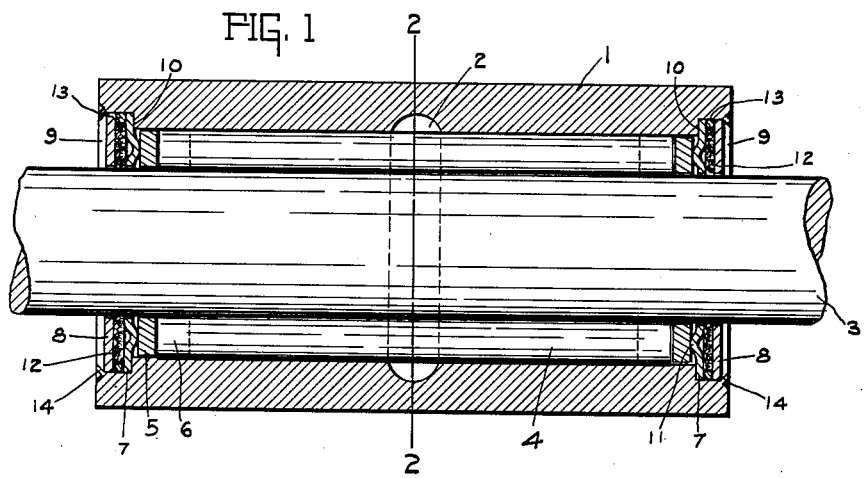
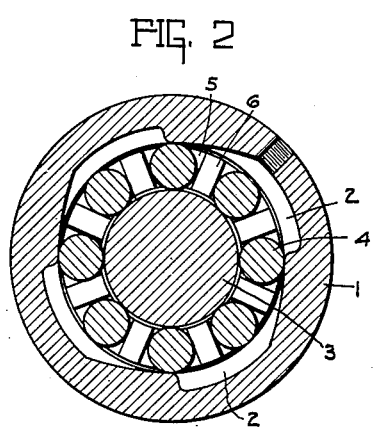
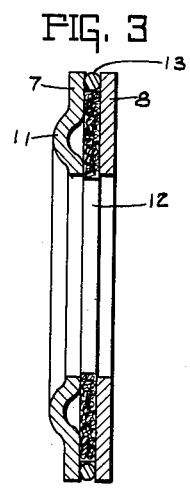
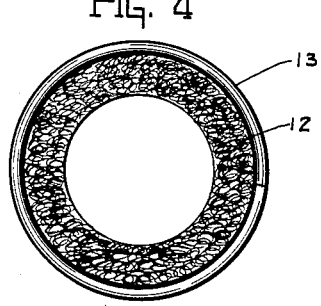
INVENTOR
WILLIAM R. WILSON.
BY
*Lockwood & Lockwood*
ATTORNEYS.

UNITED STATES PATENT OFFICE.

WILLIAM R. WILSON, OF TERRE HAUTE, INDIANA.

HUB STRUCTURE.

1,304,231.   Specification of Letters Patent.   Patented May 20, 1919.

Application filed January 21, 1918. Serial No. 212,970.

*To all whom it may concern:*

Be it known that I, WILLIAM R. WILSON, a citizen of the United States, and a resident of Terre Haute, county of Vigo, and State of Indiana, have invented a certain new and useful Hub Structure; and I do hereby declare that the following is a full, clear, and exact description thereof, reference being had to the accompanying drawings, in which like letters refer to like parts.

This invention relates to hub structures and is designed primarily to be used in connection with wheels, plow colters and like devices and one feature of the invention, in addition to providing bearing rollers in a hub structure, is the provision of means for preventing lubricant from escaping at the ends of the hub structure, which comprises a pair of washer-like structures between which is placed a disk of fabric for absorbing the lubricant as it works outwardly on the axle or shaft upon which the hub is mounted.

A further feature of the invention is the provision on one of the washer-like structures with a bearing surface for the supports or retainers for the ends of the bearing rollers whereby lubricating space will be provided and a minimum wearing and friction surface will be presented.

A further feature of the invention is the provision of means to hold the washer-like structures in spaced relation with each other, whereby it will be impossible to compress the absorbent fabric, and a further feature of the invention is the provision of means for securing the washer-like structures in engagement with the ends of the hub member.

The full nature of the invention will be understood from the accompanying drawings and the following description and claims.

Figure 1 is a central longitudinal sectional view through the hub structure showing the same attached to a shaft. Fig. 2 is a transverse sectional view thereof as seen on line 2—2 of Fig. 1. Fig. 3 is a central sectional view through the washer structures in assembled position and Fig. 4 is a plan view of the absorbent fabric and the means for preventing the same from being compressed.

Referring to the drawings in which similar reference numerals designate corresponding parts throughout the several views, 1 indicates a hub structure which may be constructed in any preferred manner, said hub having a circular depression 2 at its longitudinal center to form an oil chamber for the reception of lubricant. Extending through the hub structure is a shaft 3, the diameter of which is less than the diameter of the interior of the hub, so that bearing rollers 4 may be placed around the shaft between the shaft and hub structure, said bearing rollers being held in proper position and alinement through the medium of retaining members 5 which have fingers 6 projecting inwardly therefrom which pass between the bearing rollers.

In order to confine the retaining members and bearing rollers within the hub structure, a pair of plate-like structures 7 and 8 are provided at each end of the hub, each end of the hub having an enlarged portion 9 to form shoulders 10 against which the plates 7 abut to limit the inner movement of the plates, the diameter of the enlarged portion being substantially the same as the diameter of the plate structures 7 and 8. In order to provide space for the entrance of lubricant between the end plates 7 and the ends of the retaining members, said plates 7 are provided with circular ribs 11, which ribs are preferably formed by striking out portions of the plate structure, said ribs also presenting a minimum amount of wearing and friction surface to the retaining members.

In order to prevent any of the lubricant from passing out of the hub around the shaft or axle 3, a section of absorbent fabric 12 is introduced between each pair of plates 7 and 8, said absorbent fabric closely contacting with the periphery of the shaft 3, while the outer diameter of the fabric is of less diameter than the plates between which it is secured, thereby providing a space for the reception of a spacing ring 13, said spacing ring, when introduced between the plates limiting the movement of the plates toward each other, thus preventing the fabric from being depressed. The ring 13 may be constructed in any suitable manner, but is preferably made out of a section of wire and bent to circular form, so as to produce a ring at a minimum expense.

The plates 7 and 8 when entered into the enlarged portion 9 extend inwardly slightly beyond the end of the hub member, so that after the washers are introduced the ends of the hub may be upset as shown at 14 in Fig. 1 and this upset portion may extend entirely around the hub or may be placed at intervals around the opening at the ends of the hub, and when the plates are so secured in the hub it will be impossible to casually disengage or loosen the plates by any action or thrust of the bearing rollers against the plates. It will be understood, of course that any suitable means may be employed other than the upseting of the ends of the hub for retaining the plates in position, and owing to the extreme simplicity of the device the parts of the hub structure can be very cheaply constructed and applied to use.

The invention claimed is:—

1. In a hub structure, the combination with a hollow hub having enlarged openings at its ends, and a shaft extending through said hub, of means to close the ends of the hub to prevent leakage of lubricant therethrough, comprising a pair of washer-like plates, a section of absorbent fabric between said plates and of a diameter less than the diameter of the plates, and a ring loosely surrounding said fabric and resting between said plates adjacent their peripheral edges for holding the plates from pressing against said fabric.

2. In a hub structure, the combination with a hollow hub, of means for preventing leakage of lubricant at the ends of the hub, consisting of a pair of washer-like plates, a section of absorbent fabric between said plates, and a split ring between the plates and entirely surrounding the edge of the fabric for holding the plates away from said fabric.

3. In a hub structure, the combination with a hollow hub, of means to prevent leakage of lubricant from the end of the hub comprising washer-like plates arranged in pairs at each end of the hub, absorbent fabric between the pairs of plates, means loosely mounted between said plates for holding the plates separated, and means integral with the hub for holding the pairs of plates in the ends of the hub.

4. In a hub structure the combination with a hollow hub, of a pair of washer-like structures at each end of the hub, a section of absorbent material between the pairs of plates, a spacing ring surrounding the material and between said plates, and means struck up from the hub to secure the plates in the ends of the hub.

5. In a hub structure the combination with a hollow hub, of a pair of washer-like plates at each end of the hub, the inner plate of each pair having a rib thereon, parts of the end of the hub being struck up for holding the plates within the hub, absorbent material between said plates, and a ring surrounding the edge of the absorbent material and of a diameter equal to the diameter of the plates, adapted to prevent pressure of the plates on the absorbent material.

In witness whereof, I have hereunto affixed my signature.

WILLIAM R. WILSON.